United States Patent [19]

Walker

[11] Patent Number: 4,466,486

[45] Date of Patent: Aug. 21, 1984

[54] METHOD FOR RELEASING STUCK DRILL PIPE

[75] Inventor: Clarence O. Walker, Richmond, Tex.

[73] Assignee: Texaco Inc., White Plains, N.Y.

[21] Appl. No.: 483,786

[22] Filed: Apr. 11, 1983

[51] Int. Cl.³ .............................................. E21B 23/00
[52] U.S. Cl. .............................. 166/301; 252/8.55 R; 252/8.55 B
[58] Field of Search ................... 166/301; 252/8.5 A, 252/8.5 C, 8.55 R, 8.55 B, 8.55 C

[56] References Cited

U.S. PATENT DOCUMENTS

| | | | |
|---|---|---|---|
| 3,099,624 | 7/1963 | Wilson | 166/301 X |
| 3,126,970 | 3/1964 | Rygg | 166/301 X |
| 3,217,802 | 11/1965 | Reddie et al. | 166/312 X |
| 3,328,295 | 6/1967 | Lummus et al. | 166/301 X |
| 4,230,587 | 10/1980 | Walker | 252/8.55 |

*Primary Examiner*—Stephen J. Novosad
*Assistant Examiner*—Bruce M. Kisliuk
*Attorney, Agent, or Firm*—Robert A. Kulason; Jack H. Park; Richard A. Kulason

[57] ABSTRACT

A method is revealed for releasing a stuck drill string in a borehole of an underground formation by application of an additive fluid comprising fresh water or brine and a polymer material.

17 Claims, No Drawings

METHOD FOR RELEASING STUCK DRILL PIPE

BACKGROUND OF THE INVENTION

1. Field of the Invention

This invention relates to a method for releasing a drill string which has become stuck in the borehole of an underground formation.

2. Description of the Prior Art

During drilling operations the drill string may become stuck and cannot be raised, lowered, or rotated. There are a number of mechanisms possible which may contribute to this problem. Namely these are (1) cuttings or slough build-up in the hole, (2) an undergage hole, (3) key-seating and (4) differential pressures.

This invention relates particularly to the differential pressure problem and is intended to be a novel approach to alleviating this situation.

Differential sticking may be defined as the sticking of the drill string against a permeable formation containing less pore fluid pressure than the hydrostatic pressure exerted by the drilling fluid column and usually occurs when the drill string remains motionless for a period of time. The mechanism by which this occurs involves the drill string coming into contact with the permeable zone, remaining quiescent for a period of time sufficient for mud cake to build up on each side of the point of contact, thus sealing the pipe against the borehole. The annular pressure exerted by the drilling fluid then holds the pipe against the borehole or the permeable zone.

Freeing of differentially stuck pipe is essentially a matter of reducing this pressure differential which exists across the pipe. One method used simply involves a reduction in fluid pressure by replacing the annular fluid with a less dense fluid allowing for less pressure differential to exist between the borehole and annulus. In some cases the borehole pressure may exceed the annular pressure which in turn allows the pipe to be blown away from the borehole.

One commonly used method to release stuck pipe is the spotting of an oil mud in the hole opposite the stuck interval. With time, the mud cake around the stuck pipe becomes dehydrated from, theoretically, hydraulic forces that are applied, the cake cracks and falls away, freeing the pipe. The oil mud may penetrate between the mud cake and pipe lubricating the area between the pipe and borehole resulting in less friction and quicker release. More often than not, an extensive period of time is necessary for this to occur which results in an expensive loss of rig time.

In recent years, there has been a number of proprietary formulations developed aimed at releasing differentially stuck pipe. These also seem to require a great deal of time and the success ratio is somewhat questionable. U.S. Pat. No. 4,230,587, C. O. Walker, describes a method for releasing stuck drill pipe utilizing polyethylene glycol.

SUMMARY OF THE INVENTION

The present invention is an improved method for releasing a stuck drill string in the borehole of an underground formation. The method comprises contacting the stuck drill string with an additive composition comprising polymer such as hydroxyethyl cellulose, carboxymethyl cellulose, cellulose, and mixtures thereof in brine or polyethylene oxide, ethylene oxide-propylene oxide copolymer, polyvinyl methyl ether and mixtures thereof in brine or water. The composition is effective in dehydrating and cracking the mud cake and thereby releasing the drill string.

DESCRIPTION OF THE PREFERRED EMBODIMENTS

The present invention is an improved method for releasing a stuck drill string in the borehole of an underground formation during drilling operations employing an aqueous drilling fluid, the method comprising contacting the stuck drill string with an additive composition effective in dehydrating and cracking the mud cake and thereby releasing the stuck drill string. The additive composition comprises a polymer selected from the group consisting of hydroxyethyl cellulose, carboxymethyl cellulose, cellulose and mixtures thereof in brine or polyethylene oxide, ethylene oxide-propylene oxide copolymer, polyvinyl methyl ether and mixtures thereof in water or brine.

The cellulose of the present method is preferably cotton linters. Hydroxyethyl cellulose has preferably an average molecular weight range of about $6.8 \times 10^4$ to about $8.0 \times 10^5$. Carboxymethyl cellulose has preferably an average molecular weight of about 100,000 to about 250,000. Ethylene oxide-propylene oxide copolymer has preferably an average molecular weight of 5,000 to 50,000 and most preferably 5,000 to 15,000. Ethylene oxide-propylene oxide copolymer has at least 50% and preferably about 65% to about 75% ethoxy units, with the balance being propoxy units. Polyvinyl methyl ether has an average molecular weight of about $10^5$ to about $10^6$ and comprises repeating units of the monomer:

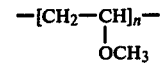

Polyethylene oxide has a molecular weight of about 5,000 to about 50,000.

By the method of the present invention, the additive composition is pumped into the borehole. This can be accomplished by several techniques well known in the art. By one technique the additive composition is pumped along the length of the stuck drill string. To formulate the additive composition, brine is mixed with 2 lb/bbl to 50 lb/bbl preferably 2 lb/bbl to 20 lb/bbl of the polymer or for the second group of polymers brine and/or water may be used.

Brine may be defined as an aqueous solution containing from 100–200,000 parts per million metal ions such as sodium and/or potassium ions. Brines contain a minor amount to 25% by weight sodium chloride and may contain various amounts of other dissolved salts such as sodium bicarbonate, sodium sulfate, and sodium borate. The invention is operable in hard water, brines or hard water brines.

Alternatively, a technique using a spotting fluid may be used in the method of the present invention. By this technique, a weighting material is mixed with the additive composition to spot the additive composition in the area to be treated. The spotting fluid is formulated by weighting the additive composition so as to position it to contact the drill string in the area adjacent the mud cake. Suitable weighting materials are soluble in water, brine and polar solvents as well as dispersible in the additive composition. The weighting material is added to weight the additive composition to a density of 8.33 lb/gal to 15 lb/gal or more. Weighting materials include a large number of metal salts such as salts of sodium, potassium, calcium, magnesium, aluminum, barium, iron, nickel, cobalt, lead, tin, zinc, copper, cadmium, manganese and strontium. Viscosifying materials such as asbestos or a water soluble polymer such as an ethylene oxide-propylene oxide copolymer, a polyvinyl methyl ether, polyethylene oxide, polysaccharide or any of the materials known in the art for viscosifying water and/or brine may also be incorporated. Such an additive composition is an effective spotting fluid which can be positioned in the borehole by techniques well known in the art to treat the binding area.

Depending on the concentration of polymer used, it is possible to prepare a spotting fluid with the polymer alone. Hydroxyethyl cellulose, carboxymethyl cellulose, cellulose and mixtures thereof or polyethylene oxide, ethylene oxide-propylene oxide copolymer, polyvinyl methyl ether and mixtures thereof may be added to achieve sufficient viscosity so that the viscosity of the spotting fluid and drilling mud is sufficiently different that the two fluids will not mix appreciably. The density of the spotting fluid is typically 8.33 lb/gal to 15 lb/gal or more.

The mechanism of the present invention is not known with mathematical certainty. It is theorized that the additive compositions of the method of the present invention dehydrate and thereby crack the mud cake around the stuck pipe section by pressure and/or by a chemical dehydration. When the mud cake is cracked the pressure is equalized and the pipe thereby freed.

The superiority of the method is two fold. First, the method of the present invention is cost effective. Per barrel fluid cost may be in some cases more costly than that of fluids presently used to release a stuck drill string such as diesel oil. However, when the hourly rental of a non productive drilling rig is taken into account it is evident that the fluid cost is a small fraction of the total drilling cost. A method which produces fastest results becomes the most cost effective overall and by such cost analysis the economic superiority of the present method if shown.

Second, the present method utilizes materials that are environmentally non disruptive. Compositions of the present art, such as diesel oil, require special handling and can cause untoward effects if allowed to escape into ground water. Materials used in the method of the present invention are safe and relatively inoffensive to the aqueous environment.

EXAMPLE 1

Additive compositions of the invention were evaluated in the laboratory to determine their effectiveness as a pipe release agent. The evaluation was carried out in the following manner.

A drilling fluid was prepared by treating a field top hole mud with 6 lbs/bbl lignosulfonate and sufficient caustic soda to achieve a pH of 10.5. This fluid was aged overnight at 150° F. to insure chemical equilibrium, cooled to room temperature, then placed in filtration cells. A pressure differential of 100 psi was applied and filtration of the mud continued until 20–25 cc. of mud filtrate was collected. The pressure was then released, the cells dismantled, and the excess mud was removed leaving the mud filter cake in place. This cake was approximately ¼" thick. The fluid to be tested was then placed in the cell which was replaced in the holding apparatus. The 100 psi pressure differential was again applied and a timer was started to measure the time of exposure. The effectiveness of several compositions was then determined based on the appearance of the mud cake after exposure to the composition of this invention. The desired effect, due to cake dehydration, was loss of cake integrity evidenced by cracking and subsequent destruction.

This test procedure permitted a comparison of additive compositions with commercially available systems. Results are reported in the following Table 1:

TABLE 1

TEST RESULTS

| TEST | ADDITIVE | CONCENTRATION | DILUENT | TEST DURATION | REMARKS |
|---|---|---|---|---|---|
| A | Polyacrylamide (1) | 1 lb/bbl | Fresh Water | 4 Hours | No Cracking |
| B | Hydroxethyl (2) Cellulose | 2 lb/bbl | Fresh Water | 4 Hours | No Cracking |
| C | Carboxymethyl (3) Cellulose | 2 lb/bbl | Fresh Water | 4 Hours | No Cracking |
| D | ULTRADRYL ® (4) | 2 lb/bbl | Fresh Water | 4 Hours | No Cracking |
| E | Polyacrylamide (1) | 1 lb/bbl | brine (8) | 2 Hours | No Cracking |
| F | Hydroxyethyl (2) Cellulose | 2 lb/bbl | brine (8) | 2 Hours | Cracked Cake |
| G | Carboxymethyl (3) Cellulose | 2 lb/bbl | brine (8) | 2 Hours | Cracked Cake |
| H | ULTRADRYL ® (4) | 2 lb/bbl | brine (8) | 2 Hours | Cracked Cake |
| I | Polyethylene (5) Oxide | 10 lb/bbl | Fresh Water | 5 min. | Severe Cracking |
| J | Polyvinyl (6) Methyl Ether | 16.7% wt. | Fresh Water | 10 min. | Moderate Cracking |
| K | Ethylene oxide-Propylene Oxide Copolymer (7) | 50% wt. | Fresh Water | 5 min. | Severe Cracking |

(1) Allied Colloid - ALCOMER ® 120; Molecular weight approximately 2,000,000
(2) Union Carbide QP-1500
(3) Drilling mud grade - Regular viscosity
(4) Primarily cellulose (cotton linters) with proprietary chemicals added.
(5) Union Carbide WSRN-80
(6) GAF M-154
(7) Texaco FF-200 - Average molecular weight 10000, 75% ethylene, 25% propylene
(8) 100,000 ppm NaCl

EXAMPLE 2

After a suspension in drilling it is found that the drilling string is differentially stuck.

Fresh water is put into a mixing tank. An ethylene oxide-propylene oxide copolymer of molecular weight 5,000 to 15,000 is added to the tank in an amount sufficient to give a polymer concentration in the final mix of 25% by volume (this is within the range of 2 lb/bbl to 50 lb/bbl polymer) and the mixing tank is mixed well. The additive composition is pumped into the wellbore and spotted. The drill string is thereby freed from the wellbore by destruction of the mud cake.

The principle of the invention and the best mode contemplated for applying the principle have been described. It is to be understood that the foregoing is illustrative only and that other means and techniques can be employed without departing from the true scope of the invention defined in the following claims.

What is claimed is:

1. An improved method for releasing a stuck drill string in a borehole of an underground formation employing an aqueous drilling fluid, the method comprising contacting the stuck drill string with an additive composition effective in dehydrating and cracking the drilling fluid or mud cake against the stuck drill string and releasing the stuck drill string, the additive composition comprising brine and a polymer selected from the group consisting of hydroxyethyl cellulose, carboxymethyl cellulose, cellulose and mixtures thereof.

2. The method of claim 1 wherein the additive composition comprises from 2 lb/bbl to 50 lb/bbl of polymer.

3. The method of claim 1 wherein the additive composition comprises from 2 lb/bbl to 20 lb/bbl of polymer.

4. The method of claim 1 wherein the additive composition additionally comprises a weighting material.

5. The method of claim 1 wherein the additive composition additionally comprises a viscosifier.

6. The method of claim 1 wherein the additive composition is brine and hydroxyethyl cellulose of average molecular weight $6.8 \times 10^4$ to $8.0 \times 10^5$.

7. The method of claim 1 wherein the additive composition is brine and carboxymethyl cellulose of average molecular weight 100,000 to 250,000.

8. The method of claim 1 wherein the additive composition is brine and cotton linters.

9. An improved method for releasing a stuck drill string in a borehole of an underground formation employing an aqueous drilling fluid, the method comprising contacting the stuck drill string with an additive composition effective in dehydrating and cracking the drilling fluid or mud cake against the stuck drill string and releasing the stuck drill string, the additive composition comprising water and a polymer selected from the group consisting of polyethylene oxide, ethylene oxide-propylene oxide copolymer, polyvinyl methyl ether and mixtures thereof.

10. The method of claim 9 wherein the additive composition additionally comprises brine.

11. The method of claim 9 wherein the additive composition additionally comprises a weighting material.

12. The method of claim 9 wherein the additive composition is water and polyethylene oxide of molecular weight 5,000 to 50,000.

13. The method of claim 9 wherein the additive composition is water and polyvinyl methyl ether of molecular weight $10^5$ to $10^6$.

14. The method of claim 9 wherein the additive composition is water and ethylene oxide-propylene oxide copolymer of molecular weight 5,000 to 50,000.

15. The method of claim 9 wherein the additive composition is water and ethylene oxide-propylene oxide copolymer of molecular weight 5,000 to 15,000.

16. The method of claim 9 wherein the additive composition comprises 2 lb/bbl to 50 lb/bbl of polymer.

17. The method of claim 9 wherein the additive composition comprises from 2 lb/bbl to 20 lb/bbl of polymer.

* * * * *